Nov. 29, 1938. T. P. FLYNN ET AL 2,138,150
CUTTING EDGE BIT FOR GRADING EQUIPMENT
Filed Oct. 6, 1937

INVENTOR.
THEODORE P. FLYNN.
RAY E. NEILS.
BY M. G. White, P. D. Cronin,
C. W. Bayle, H. N. Foss, T. G. Meriwether,
and C. J. Kramer
ATTORNEYS.

Patented Nov. 29, 1938

2,138,150

UNITED STATES PATENT OFFICE 2,138,150

CUTTING EDGE BIT FOR GRADING EQUIPMENT

Theodore P. Flynn and Ray E. Neils, Portland, Oreg., dedicated to the free use of the People of the United States Application October 6, 1937, Serial No. 167,502

3 Claims. (Cl. 37—143)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People of the United States to take effect on the granting of a patent to us.

This invention relates to mold boards on grading equipment, and is more particularly concerned with a novel method for attaching a cutting edge bit thereto.

An object of this invention is to provide a method of removably securing a cutting edge bit to a mold board without the use of plow head bolts or any other type of bolts.

Another object is to provide an improved type of connection that completely obviates the necessity of drilling any bolt holes through the cutting edge bit.

Still another object is to preserve the original skin or surface of the steel in the cutting edge bit which skin or surface is greatly disturbed by the use of bolt holes such as those used on conventional bits.

A further object is to eliminate bolt heads or other fastening connections from being exposed to wear on the front surface of a cutting edge bit.

A still further object is to provide a method of connecting and fastening cutting edge bits to mold boards whereby the operation of attaching and detaching can be done in a very short time compared to the time it takes to attach or detach cutting edges that are secured with bolts.

Another and further object is to provide, through the use of wedge keys, an arrangement whereby said keys can be simply removed with no more than a hammer, thus obviating the necessity of using cutting torches, chisels, or other expensive methods to cut off bolts and nuts.

Another and still further object is to provide by the use of wide, sturdy lugs, wide slots, and wedge keys, a surface bearing against the mold board having a much larger area than can be provided with the conventional type bolt fastening, thus preventing tearing and pulling on the mold board at the point where fastenings are made thereto.

The following specification considered together with the accompanying drawing will fully disclose this invention, and further objects and advantages thereof will be apparent.

Figure 1:
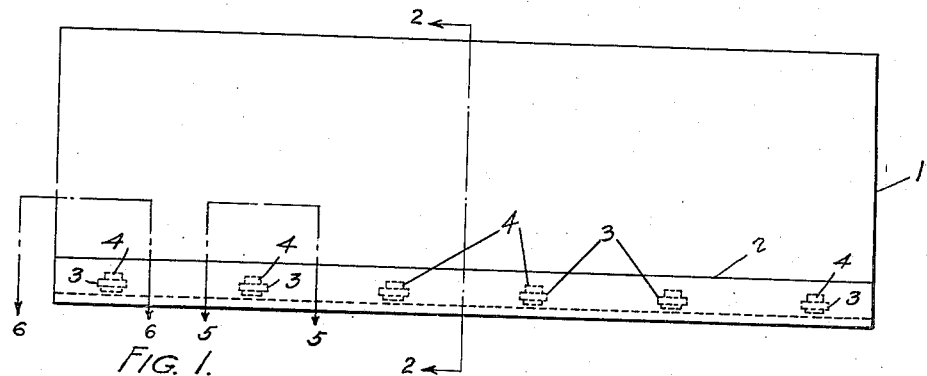
Figure 1 is a front elevational view of a grader blade or mold board showing arrangement of the cutting edge bit with lug and key fastenings.
Figure 3:
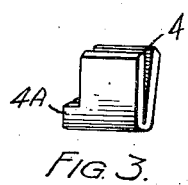
Figure 3 is a perspective view of the bit holding lug key, hereinafter designated by the numeral 4.
Figure 2:
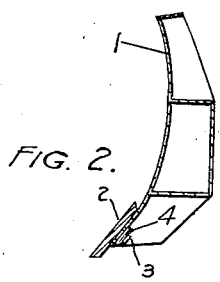
Figure 2 is a vertical sectional view of Figure 1 along the line 2—2.
Figure 4:
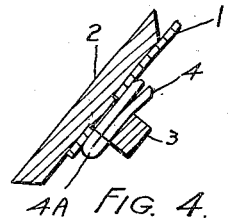
Figure 4 is an enlarged vertical sectional view through the cutting edge bit showing the method of holding it in position.

Referring with more particularity to the drawing in which like numerals refer to like parts, the numeral 1 designates a mold board and the numeral 2 a cutting edge bit fastened thereto by means of a plurality of lugs 3 and split keys 4. Each of these lugs is an integral part of the member 2 and passes through slotted openings of the mold board 1 near its bottom and is made secure thereto by introducing split keys 4 into the slots of the protruding lugs 3 preferably from the bottom side of said lugs and wedging one half of the split keys 4 apart from the other half, more clearly shown in Figure 4. Said split keys 4 are normally open in the form of a wedge and the two sides thereof can only be brought together by overcoming the natural spring of the metal, preferable steel, from which they are fabricated. Consequently when these keys are driven into the slots of the protruding lugs 3 they are constantly under compression exerting a force against the back of moldboard 1 and the protruding end of the slots in the lugs 3. In this manner the bit 2 is constantly held against the face of the moldboard 1 with a pressure corresponding to the total force exerted by all of the keys 4, and any slack between said bit 2 and moldboard 1, within the limits of expansion of said keys 4, is immediately taken up. In order to obtain a good surface contact between the mold board 1 and the cutting bit 2, the widths of the lugs 3 are so disposed as to extend into the openings in the mold board that receive them, thereby not interfering with the wedging action of the split keys 4 when said keys are driven into place and wedged apart. To prevent the lug keys from sliding out upwardly, a projecting lip 4A is disposed on each of them and designed to abut the lower side of the lugs 3, substantially as shown.

Figure 6:
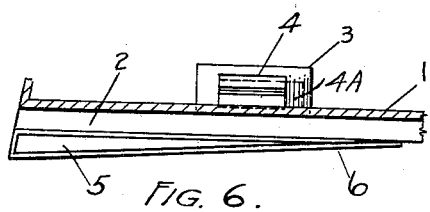
Figure 6 is an enlarged plan view of a fragmentary portion of Figure 1 along the line 6—6.
Figure 5:
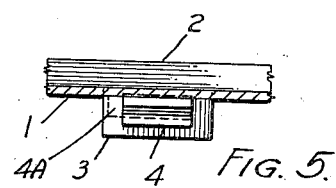
Figure 5 is an enlarged plan view of a fragmentary portion of Figure 1 along the line 5—5.
Figure 7:
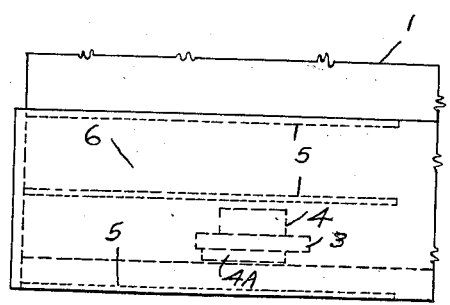
Figure 7 is an enlarged fragmentary front elevational view, showing reinforcing means for the end of the cutting edge bit.

Referring with more particularity to Figures 6 and 7, rib supports 5 are welded to the cutting bit 2 and are covered with a surface plate 6 at each end of the cutting edge bit to act as a reinforcement. This design not only gives the advantage of a box section construction for strength, but also permits the renewal of the surface or wear plate 6 very easily and inexpensively.

The above described arrangement of parts provides large sturdy connections of the cutting edge member to the mold board. By using large, wide bearing lugs as connectors for the cutting edge member, the plow and other type of bolt connections are eliminated, together with the damaging effect of drilled holes in said cutting edge member. Also, a smaller number of connectors are necessary than where bolts are used. This, of course, reduces the number of holes that must be made in the mold board giving greater area of contact of the cutting edge member with the mold board and increasing the life and use of the mold board at the points where the edges are usually attached.

When it is desired to remove or change present conventional cutting edges where bolts are employed for connecting the cutting edge member to the mold board, the bolts and nuts must often be removed with a cutting torch which takes a considerable length of time, in addition to the fact that new bolts and nuts must be supplied for refastening.

With the present invention, using a slotted lug with a wedge key system of attachment, the wedges are merely tapped out with a hammer. The cutting edge member with the lugs can then be removed from the slotted holes of the mold board. If the cutting edge member is of the double edge type it can be turned upside down and its slotted lugs pushed back through the slots in the mold board. The wedge keys can then be tapped back into place. Thus a complete operation of changing or reversing the cutting edge member is accomplished in a very short time.

Having thus described our invention, we claim:

1. A cutting edge bit for the moldboard of a grading machine having a plurality of slotted lugs secured to the back of the cutting edge bit designed to register with a plurality of slots in said mold board and to protrude therethrough, and spring wedge keys disposed in the slots of said lugs.

2. A cutting edge bit for the moldboard of a grading machine having a plurality of slotted lugs secured to the back of the cutting edge bit designed to register with a plurality of slots in said moldboard and to protrude therethrough, and lipped spring wedge keys disposed in the slots of said lugs.

3. A non-perforated cutting edge bit for the moldboard of a grading machine having a plurality of slotted lugs secured to the back of the cutting edge bit designed to register with a plurality of slots in said moldboard and to protrude therethrough, and spring wedge keys disposed in the slots of said lugs.

THEODORE P. FLYNN.
RAY E. NEILS.